Patented Sept. 12, 1922.

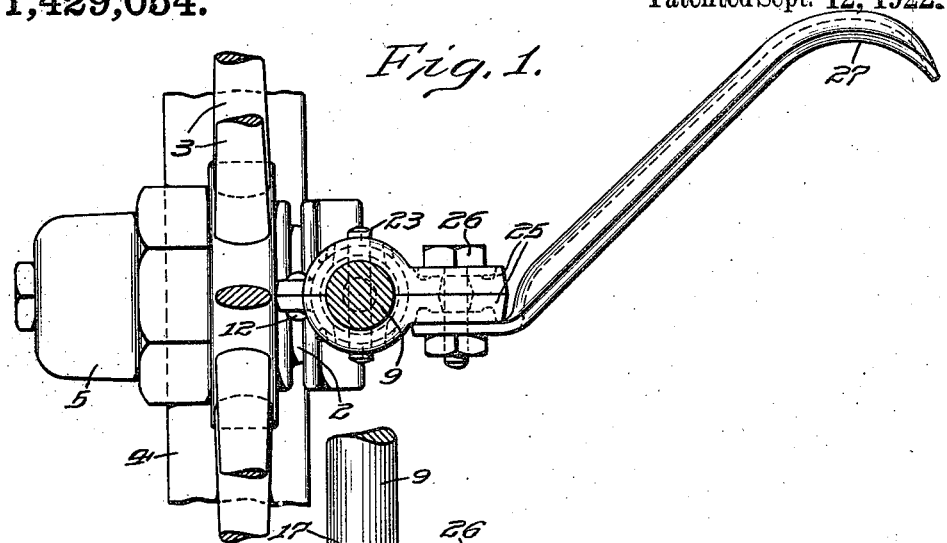
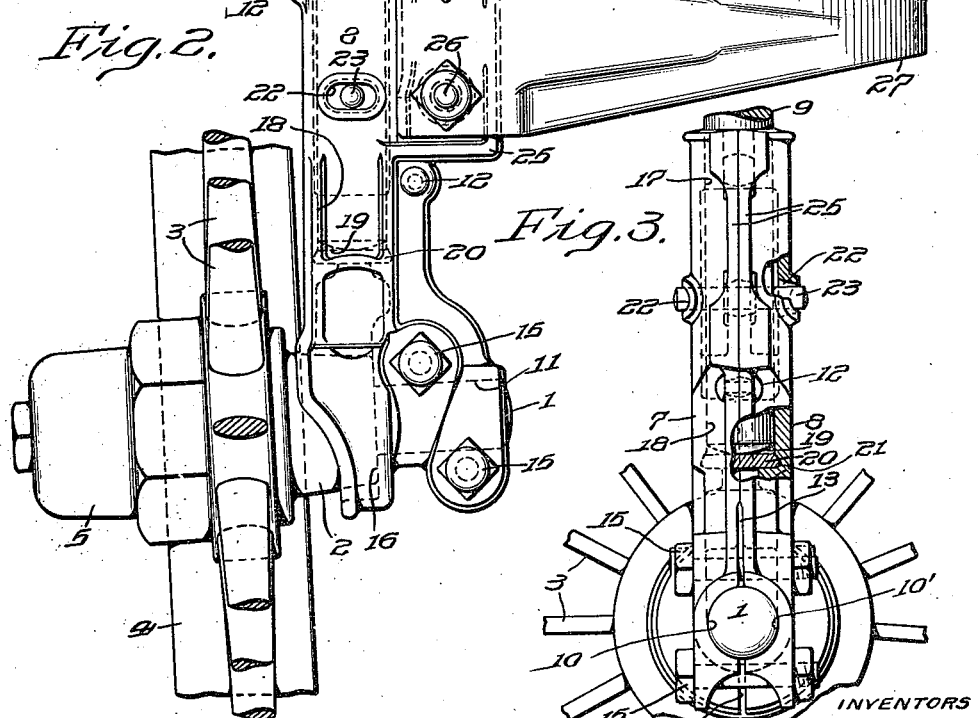

1,429,054

UNITED STATES PATENT OFFICE.

WILLIAM C. WARREN AND GEORGE L. KIER, OF PHILADELPHIA, PENNSYLVANIA, ASSIGNORS TO S. L. ALLEN & CO., INC., A CORPORATION OF PENNSYLVANIA.

AGRICULTURAL IMPLEMENT.

Application filed May 28, 1921. Serial No. 473,455.

*To all whom it may concern:*

Be it known that we, WILLIAM C. WARREN and GEORGE L. KIER, citizens of the United States, and residents of Philadelphia, county of Philadelphia, and State of Pennsylvania, have invented certain new and useful Improvements in Agricultural Implements, of which the following is a specification, reference being had to the accompanying drawing.

Our invention relates more particularly to that class of agricultural implements in which the ground wheels are mounted on stub axles carried in suitable housings in turn connected with the implement frame by suitable connecting means, and is particularly adapted for utilization in horse-drawn cultivators and other substantially similar implements, such, for example, as the form of two-horse riding cultivator forming the subject of an application for Letters Patent of the United States filed by David R. Richie, of even date herewith.

A principal object of our invention is to provide in an agricultural implement an axle and axle supporting housing of improved form and construction designed to permit the ready removal and replacement of the axle so that in case of breakage of the latter a new axle may be easily substituted for the damaged one by the user of the machine without the aid of an expert mechanic and with tools of the simplest character. Our invention further comprehends the utilization of a novel form of anti-friction means for minimizing the friction between the housing supporting means or hanger and the housing as well as such further objects and novel features of construction and arrangement as are hereinafter more definitely described or illustrated in the accompanying drawing.

To enable those skilled in the art to practice the invention, we have illustrated in the said drawing and will now proceed to describe a preferred form of means suitable for effecting the objects and functions aforesaid, only so much of the wheels of the implement and of certain other portions thereof being shown as is requisite for a proper understanding of the invention.

In the said drawing Fig. 1 is a top plan view of that form of the invention now to be described showing a portion of one of the implement ground wheels in operative position on the axle as well as one of the foot rests preferably employed to assist in steering the implement, a portion of the hanger by means of which the axle supporting housing is operatively connected with the implement frame being shown in horizontal section; Fig. 2 is a rear elevation of the parts shown in Fig. 1, and Fig. 3 an end elevation thereof looking outwardly from the center line of the machine toward the wheel, the foot rest being removed for the sake of clearness. Like numerals are used to designate corresponding parts in the several figures.

In the form of the invention shown, the stub axle 1 is composed of a cylindrical bar of steel or other suitable metal and in practice this axle is preferably cut from stock of standard diameter, such as 1¼" stock, so that in case of the axle being damaged a new one may be readily fabricated by cutting off a length of material of similar diameter without the necessity of turning the same down in a lathe to some arbitrary or non-standard size. This axle serves to support on its outer extremity the hub 2 of the ground wheel from which outwardly radiate the spokes 3 to support the rim 4 in the ordinary manner, the hub, wheels and rim being of any desired construction, a dust cap 5 being threaded onto the outer extremity of the hub to prevent the entrance of foreign matter to its interior and to assist in maintaining lubricant therein. It will be understood that the axle is stationarily supported as hereinafter described and that the hub and in turn the wheel is free to rotate thereon, the interior of the hub being either arranged to contact directly with the axle to form a plain bearing thereon or being provided with anti-friction means, such as a suitable roller bearing, adapted to contact with the axle in the ordinary manner, a lock nut or other suitable means (not shown) being positioned adjacent to outer end of the axle within the dust cap to prevent the hub from sliding longitudinally off the axle.

The inner end of the axle is rigidly operatively supported in a supporting housing comprising a pair of complementary members 7 and 8 which are formed in such manner that when secured together they will provide a substantially horizontally extending cylindrical socket for the reception of the axle and also a substantially vertically extending socket for the reception of the end of the hanger 9 which serves to effect an operative connection between the housing and the frame of the implement. For this purpose the lower portion of each of the members 7 and 8 is provided with transversely extending, outwardly swelled boss or jaw having a substantially semi-circular groove or cavity 10, 10' formed in its inner face on a radius very slightly greater than the radius of the axle so that when the two members are held in juxtaposed relation the two grooves will together form the substantially cylindrical socket 11 having a diameter very slightly in excess of that of the axle so that the latter may be readily inserted therein. It will be understood that when assembled, the members are rigidly held together by suitably disposed rivets 12 and in order to provide means for fixedly clamping the axle in position in the housing the inner face of each member above and below the socket 11 is cut away slightly to provide clearance spaces 13 and the members transversely drilled above and below the socket to permit the passage of clamping bolts 15 which are operative when set up to draw the jaws slightly together and thus securely clamp the axle therebetween. Preferably the members adjacent the outer extremity of the axle receiving aperture or socket are faced off as at 16 to provide a surface normal to the longitudinal axis of the axle against which the inner end of the hub is adapted to abut, the members being swelled outwardly in opposite directions and carried down in front of this surface so as to provide a sort of cup for the reception of the inner end of the hub to form a dust guard thereover. Preferably in order that the ground wheels may be given a slight camber, the axle receiving aperture 10 is inclined downwardly and outwardly as best shown in Fig. 2, so that when the axle is received and clamped therein it will also assume a similar outwardly and downwardly inclined position.

From above the axle receiving portions of the members 7 and 8, the latter are directed upwardly and preferably swelled outwardly so as to provide a vertically extending cylindrical socket for the reception of the lower end of the cylindrical hanger 9 and to provide a suitable surface for working engagement with the hanger the interior of the socket may either be machined all over or else may be cored out in such manner as to provide bearing lugs or surfaces 17 and 18 respectively adjacent the upper and lower portions of the socket as shown, which surfaces alone are machined and arranged to contact with the hanger, the balance of the interior of the sockets being spaced therefrom.

It will be understood that as the housing is assembled on the hanger by inserting the end of the latter in the hanger socket as far as it will go, the weight of the frame and other parts of the implement supported on the hanger are thus transferred from the latter to the bottom of the socket and in turn from the latter to the axle and ground wheel and for the purpose of minimizing the friction between the end of the hanger and the socket when the latter is turned about the hanger in the operation of steering the implement, the lower end of the hanger is preferably made slightly spherical as at 19 and a flat hardened steel washer or disk 20 positioned horizontally in the bottom of the socket preferably in a small groove or recess 21 formed in the walls thereof, the washer being inserted prior to the assembly of the members of the housing and gripped in the recess when the members are drawn together by the rivets. In this way a simple and satisfactory antifriction bearing is provided at this point.

Each of the housing members is preferably provided about midway of the length of the socket with a substantially horizontally extending groove or slot 22 and after the hanger is inserted in the socket, a pin 23 is driven through the slots and a properly positioned hole formed in the hanger and arranged so that its ends will project beyond the surface of the hanger and into the slots 22 so as to both prevent the withdrawal of the hanger from the socket and also limit through the contact of the ends of the pins with the ends of the slots the amount which the housing may be turned about the hanger.

Preferably adjacent the upper portion of the housing the members thereof are directed inwardly to form corresponding lugs 25 to which are secured through the medium of the bolts 26 the inner end of the foot rest 27 which is suitably formed to project inwardly toward the center line of the machine and provide a convenient rest for the operator's foot when the implement is in use, and by means of which the operator may move the housing about the hanger to assist in steering the implement.

It will thus appear that we have provided a convenient and simple means for mounting a stub axle in an implement of the class to which reference has been made and in turn of effecting a suitable connection between the axle and implement frame through the medium of the housing and hanger, the several parts being so designed and constructed as to facilitate the ready removal and replacement of the axle from the housing in case of damage to the former, and that by utilization of the anti-friction means to which reference has been made the effort required to effect the steering of the implement is minimized. Additionally, the axle employed as well as the members of the housing are of such form as to facilitate production and avoid excessive machine work, thus lowering the cost of manufacture without any sacrifice of utility.

While in the drawing we have shown the invention as applied to but one side of an implement it will of course be understood that in practice a corresponding mounting is employed on the opposite side of the implement for supporting the other ground wheel and moreover, that while we have illustrated and described with considerable particularity a preferred embodiment of the invention we do not thereby desire or intend to specifically limit ourselves to any precise details of construction and arrangement of the various parts as the same may be suitably modified to better adapt the invention for use with different forms of implements and for other purposes without departing from the spirit and scope of the invention as defined in the appended claims.

Having thus described our invention, we claim and desire to protect by Letters Patent of the United States:

1. In a machine of the class described, the combination with a vertically extending hanger, of an axle-supporting housing comprising a pair of oppositely disposed members arranged to form a socket for the reception of said hanger, anti-friction means contained in and forming a bottom to said socket and coöperative with the hanger, means operative to retain the hanger in the socket, and a substantially horizontally extending cylindrical stub axle removably positioned adjacent the lower extremity of said housing.

2. In a machine of the class described, the combination with a cylindrical hanger having a spherical end surface, of an axle supporting housing comprising a pair of oppositely disposed members shaped to provide a cylindrical socket to receive said hanger and another socket to receive an axle, a disk positioned in the first mentioned socket forming a bottom thereto and adapted to contact with said spherical surface and support said hanger, means for preventing the withdrawal of the hanger from the socket and for limiting rotative movement of the housing on the hanger, an axle adapted to extend within said second mentioned socket, and means operative to draw said members together adjacent said socket to clamp the axle therein.

3. In a machine of the class described, the combination of a vertically disposed hanger cylindrical in cross section adjacent its free end and an axle supporting housing comprising a pair of oppositely disposed complementary members shaped to provide a cylindrical socket for the end of the hanger and another socket extending transversely thereto adapted to receive the axle, a disk horizontally positioned in the bottom of the cylindrical socket and forming a bearing for the end of the hanger, an axle in the other socket, and means for compressing the members thereof to fixedly position the axle therein.

In witness whereof, we have hereunto set our hand this 26th day of May, A. D., 1921.

WILLIAM C. WARREN.
GEORGE L. KIER.